(12) United States Patent
Saito et al.

(10) Patent No.: US 6,222,682 B1
(45) Date of Patent: Apr. 24, 2001

(54) IMAGE PICKUP LENS SYSTEM

(75) Inventors: Tomohiro Saito; Isamu Kaneko, both of Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/513,100

(22) Filed: Feb. 25, 2000

(30) Foreign Application Priority Data

Mar. 5, 1999 (JP) .................................................. 11-058268

(51) Int. Cl.[7] .................................................... G02B 13/18
(52) U.S. Cl. .............................................................. 359/717
(58) Field of Search ................................... 359/717, 719, 359/718

(56) References Cited

U.S. PATENT DOCUMENTS

Re. 34,455 * 11/1993 Arai et al. ............................ 359/719
5,917,661 * 6/1999 Tochigi et al. ....................... 359/717

* cited by examiner

Primary Examiner—Scott J. Sugarman
(74) Attorney, Agent, or Firm—Koda & Androlia

(57) ABSTRACT

An image pickup lens system includes a first lens which is a concave lens having those radii of curvature of faces at the center thereof, which are not of the same sign, and a second lens which is a convex lens. The first face of at least the first lens is formed into an aspherical shape. The focal length of the entire lens system is set in a range of from 0.67 times the back focal length to 1.45 times the back focal length, and the focal length of the second lens is set in a range of 0.25 times the focal length of the first lens to 0.8 times the focal length of the first lens. Thus, it is possible to ensure the back focal length, while shortening the focal length of the image pickup lens system, and to easily produce the image pickup lens system.

2 Claims, 11 Drawing Sheets

IMAGE PICKUP LENS SYSTEM

BACKGROUND OF THE INVENTION

1. Field of the Invention

The present invention relates to an image pickup lens system and particularly, to an image pickup lens system which is comprised of two lenses and used in an image pick-up device, e.g., a CCD camera utilizing an image pickup element such as CCD, CMOS and the like mounted on a potable computer, a visual telephone and the like, and which can be reduced in size and weight.

2. Description of the Related Art

In recent years, multimedia have been developed remarkably, and for example, the demand for a camera utilizing an image pickup element such as CCD, CMOS and like, e.g., a CCD camera mounted on a portable computer, a visual telephone and the like is being increased remarkably. Such a CCD camera is required to be mounted in a limited space and for this reason, it is desired that the CCD camera is small in size and lightweight.

Therefore, it is also desired that a two-lens system using two lenses is conventionally used as such an image pickup lens system.

There are image-pickup lenses used in such a conventional two-lens system, which are disclosed, for example, in Japanese Patent Application Laid-open No.10-104511 and Japanese Patent Publication No.7-50246 and the like.

In the lens system using the image pickup lenses disclosed in the above Patents, the first and second lenses are disposed sequentially in the named order from the side of an object. The first lens is a meniscus concave lens having the same signs of radii of curvature at centers of first and second faces, and the second lens is a convex lens. Such a construction can ensure a back focal length, while shortening the focal length.

However, the conventional image pickup lens disclosed in Japanese Patent Application Laid-open No.10-104511 suffers from a problem that the radius of curvature of the center of the second face of the first lens is relatively small and for this reason, it is difficult to manufacture such lens. Another problem is that if a diaphragm is disposed at a location displaced from the second lens toward an image surface in order to correct the magnification chromatic aberration, the diameter of the first lens is increased and hence, it is further difficult to form the second face of the first lens. Such conventional image pickup lens suffers from a further problem that because it is difficult to form the second face, it is little possible to accommodate the angle-widening of the image pickup lens, i.e., the shortening of the focal length.

The image pickup lens disclosed in Japanese Patent Publication No.7-50246 has a fatal problem that the entire length of the optical system of the lens is increased by reason of the structure of the lens. The optical system of such an arrangement also suffers from the following problem: If stray light enters the lens system of the image pickup lens from outside an angle of view, a ghost is generated. Therefore, it is required that the shape of the first face of the first lens in the vicinity of an optical axis approximates to a planar shape. However, an increase in diameter of the first lens leads to a convex shape of the first face of the first lens, resulting in a reduction in performance of the image pickup lens. Moreover, the power of the first lens is largely associated with the generation of each aberration such as a distortion and the like and hence, there is also a problem that if the shape of the first face of the first lens is convex, the distortion and the like cannot be removed.

SUMMARY OF THE INVENTION

Accordingly, it is an object of the present invention to provide an image pickup lens system in which a back focal length can be ensured, while shortening the focal length and moreover, which can be produced easily.

To achieve the above object, according to the present invention, there is provided an image pickup lens system, comprising a first lens which is a concave lens having those radii of curvature of faces at the center thereof, which are not of the same sign, and a second lens which is a convex lens, the first face of at least the first lens being formed into an aspherical shape, so that the following conditions (1) and (2) are satisfied:

(1) $0.67 Bf < f < 1.45 Bf$ (2) $0.25|f_1| < |f_2| < 0.8|f_1|$ wherein Bf is a back focal length; f is a focal length of the entire lens system; $f_1$ is a focal length of the first lens; and $f_2$ is a focal length of the second lens.

In the above feature of the present invention, the expressions (1) and (2) represent conditions ensuring that in a state in which the curvatures of the first and second lenses have been maintained at small values, the focal length of the entire lens system can be shortened, and a large back focal length can be ensured. If the focal length of the entire lens system exceeds the lower limit value in the expression (1) it is impossible to provide a reduction in size of the lens system, and if the lens focal length of the entire lens system exceeds the upper limit value, it is impossible to insert any of various types of filters. On the other hand, if the focal length of the second lens exceeds the lower limit value in the second expression (2), it is impossible to ensure a large back focal length, while maintaining a desired optical performance, and to insert any of various types of filters. If the focal length of the second lens in the second expression (2) exceeds the upper limit value, the power of the first lens is too strong and hence, it is difficult to manufacture the first lens. Moreover, each of aberrations such as distortion and the like is liable to be generated. According to the present invention, however, the back focal length can be increased relative to the focal length of the entire lens system, while maintaining the desired optical performance, by satisfying the conditions represented by the expressions. Moreover, the radii of curvature of the first and second faces of the first lens are not of the same sign and hence, the radius of curvature of the second face of the first lens at the center thereof can be increased and thus, the first lens can be produced easily. Particularly, even when a diaphragm for correcting the chromatic aberration is disposed at a location displaced from the second lens toward an image, it is possible to easily produce the first lens. In addition, it is possible to easily accommodate the angle-widening.

The above and other objects, features and advantages of the invention will become apparent from the following description of the preferred embodiment taken in conjunction with the accompanying drawings.

DESCRIPTION OF THE PREFERRED EMBODIMENT

Figure 1:
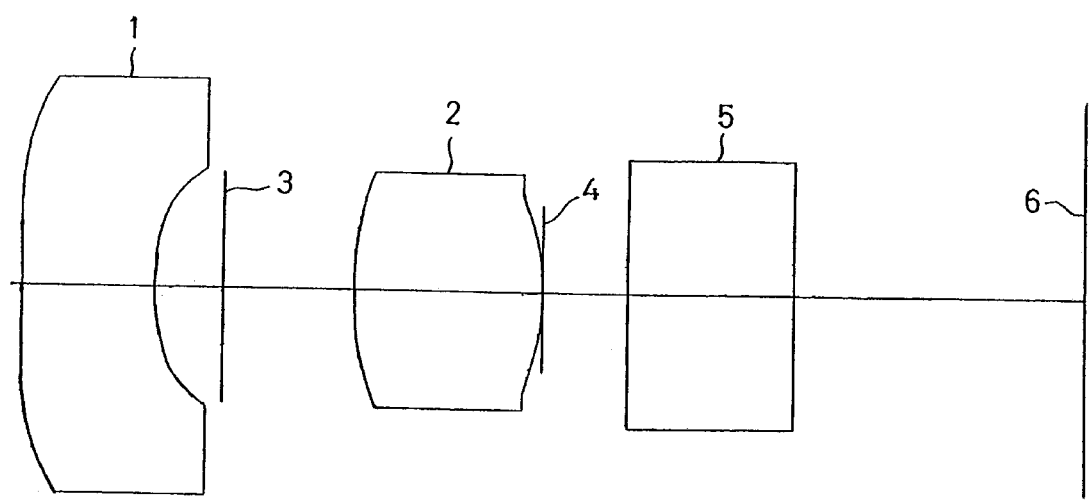
FIG. 1 is an illustration of an arrangement of an embodiment of an image pickup lens system according to the present invention.

The present invention will now be described by way of an embodiment with reference to the accompanying drawings. FIG. 1 shows a basic structure of an image pickup lens system according to the present invention. Referring to FIG. 1, The image pickup lens system comprises a first lens 1 which is a concave lens having radii of curvature of faces at the center thereof, which are not of the same sign, and a second lens 2 which is a convex lens. Each of the first and second lenses is formed of a resin such as a thermoplastic resin. In the present embodiment, the first face of the first lens 1 adjacent an object is formed into an aspherical shape, and the first and second lenses are formed to satisfy the following conditions:

(1) $0.67Bf < f < 1.45Bf$
(2) $0.25|f_1| < |f_2| < 0.8|f_1|$ wherein Bf is a back focal length; f is a focal length of the entire lens system; $f_1$ is a focal length of the first lens; and $f_2$ is a focal length of the second lens.

An aperture plate 3 and a diaphragm 4 are disposed adjacent the second face of the first lens 1 and adjacent the second face of the second lens 2, respectively. A cover glass 5 and a CCD board 6 having CCD mounted thereon as an image pickup element are disposed sequentially in the named order at locations on the side of the second face of the second lens 2.

It is a condition that the radii of curvature of the first and second faces of the first lens at the center thereof are not of -the same sign. For example, the radii of curvature of the first and second faces of the first lens at the center thereof may be of different signs, and in some cases, the first face may be a planar. Further, the diaphragm 4 may be disposed at a location on the side of the first face of the second lens.

In the present embodiment, the expressions (1) and (2) represents conditions ensuring that in a state in which the curvatures of the first and second lenses have been maintained at small values, the focal length of the entire lens system can be shortened, and a large back focal length can be ensured. If the focal length of the entire lens system exceeds the lower limit value in the expression (1), it is impossible to provide a reduction in size of the lens system, and if the lens focal length of the entire lens system exceeds the upper limit value, it is impossible to insert any of various types of filters. On the other hand, if the focal length of the second lens exceeds the lower limit value in the second expression (2), it is impossible to ensure a large back focal length, while maintaining a desired optical performance, and to insert any of various types of filters. If the focal length of the second lens in the second expression (2) exceeds the upper limit value, the power of the first lens is too strong and hence, it is difficult to manufacture the first lens. Moreover, each of aberrations such as distortion and the like is liable to be generated.

In the present embodiment, the back focal length can be increased relative to the focal length of the entire lens system, while maintaining a desired optical performance by satisfying the conditions represented by the above-described expressions. Moreover, because the radii of curvature of the first and second faces of the first lens at the center thereof are not of the same sign, the radius of the second face of the first lens at the center thereof can be increased and thus, the first lens can be produced easily. Particularly, even when the diaphragm for correcting the chromatic aberration is disposed at a location displaced from the second lens toward an image, it is possible to easily produce the first lens. In addition, it is possible to easily accommodate the angle-widening.

EXAMPLES

Examples of the present invention will be described below with reference to FIGS. 2 to 11.

In the examples, f represents a focal length of the entire system; $f_1$ represents a focal length of the first lens; $f_2$ represents a focal length of the second lens; Bf represents a back focal length; F represents an F number; 2ω represents an angle of view; r represents a radius of curvature of each of the lenses; d represents a lens thickness or an air gap; and nd represents a refractive index.

If the direction of an optical axis is taken on an X axis; the direction perpendicular to the optical axis is taken on an Y axis; and the direction of advancement of light is positive, the shape of the aspherical surface of the lens is represented according to the following equation:

$$Z = \frac{\frac{x^2}{r}}{1 + \sqrt{1 - (k+1)\frac{x^2}{r^2}}} + ax^4 + bx^6 + cx^8 + dx^{10}$$

wherein each of k, a and b is an aspherical coefficient.

Example 1

Figure 2:
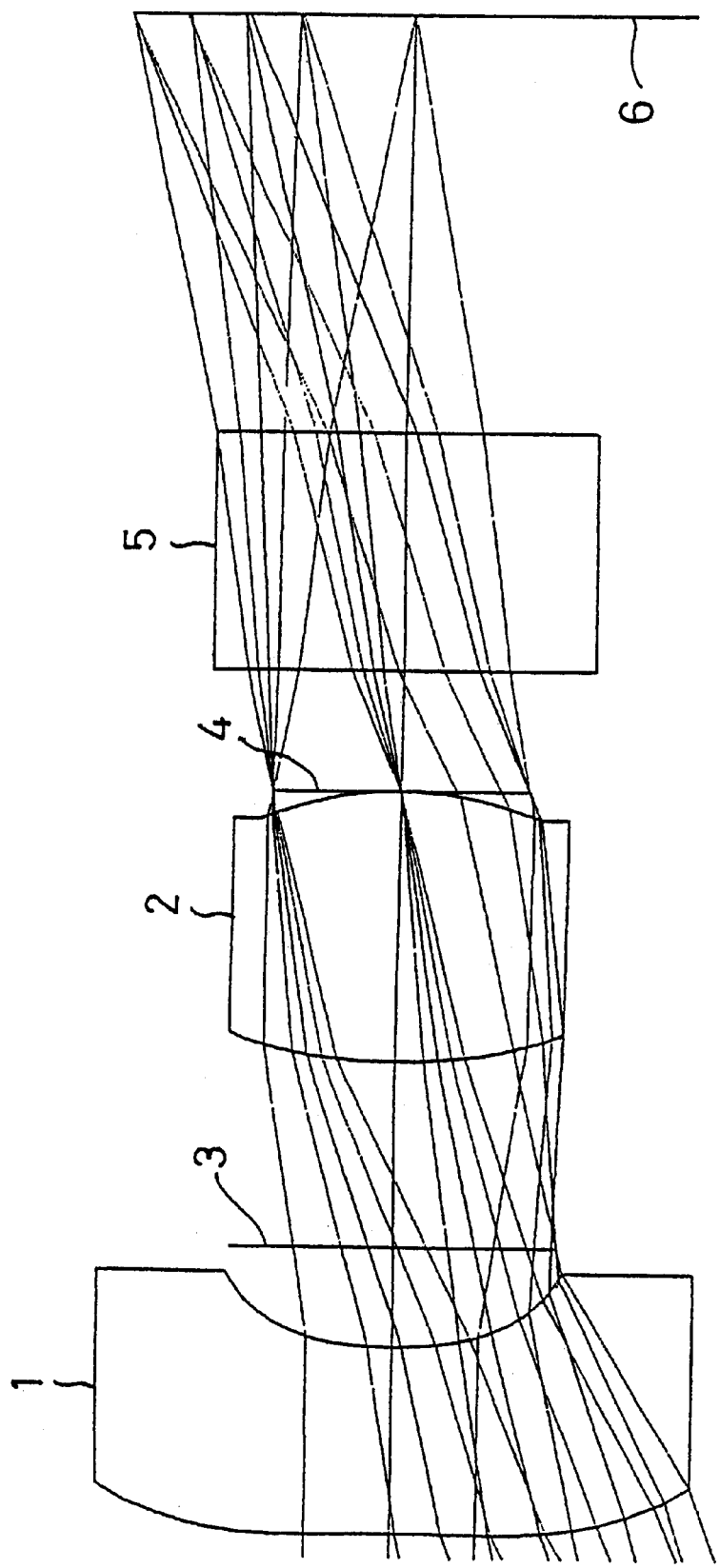
FIG. 2 is an illustration showing a first example of an image pickup lens system according to the present invention.

FIG. 2 shows a first example of the present invention. This example is an image pickup lens system as shown in FIG. 1. In this example, a diaphragm 4 is disposed at a location displaced from the second face of a second lens toward an image. The image pickup lens system of the first example is set under conditions which will be described below.

The back focal length Bf in the present example is an air-reduced length from the diaphragm 4 to the CCD face (the image pickup face.

f=3.824 mm  F=2.80  2ω=60.4°
$f_1$=−5.74 mm  $f_2$=3.70 mm  Bf=5.643 mm

| Face | Radius r of curvature | Distance d | Refractive index nd | Abbe constant vd |
|---|---|---|---|---|
| (1) First face of first lens | −20.000 | 1.5000 | 1.49194 | 57.8 |
| (2) Second face of first lens | 3.368 | 0.8000 | | |

-continued

| Face | Radius r of curvature | Distance d | Refractive index nd | Abbe constant vd |
|---|---|---|---|---|
| (3) aperture plate | 0.000 | 1.5000 | | |
| (4) First face of second lens | 4.782 | 2.2000 | 1.49194 | 57.8 |
| (5) Second face of second lens | −2.495 | 0.0000 | | |
| (6) Diaphragm | 0.000 | 1.0000 | | |
| (7) First face of cover glass | 0.000 | 1.9500 | 1.51633 | 64.2 |
| (8) Second face of cover glass | 0.000 | 3.3574 | | |
| (9) CCD face | 0.000 | | | |

| | k | b |
|---|---|---|
| 1 | 0.000000e + 000 | 2.677496e − 002 | −3.582283e − 003 |
| 2 | 4.195393e + 000 | 5.203218e − 002 | −6.019565e − 004 |
| 4 | 8.857730e − 002 | 7.913814e − 003 | 3.195183e − 003 |
| 5 | −9.406460e − 001 | 8.471107e − 003 | 1.139263e − 003 |

| | c | d |
|---|---|---|
| 1 | 4.450087e − 004 | −2.359879e − 005 |
| 2 | 2.687157e − 003 | 1.414090e − 003 |
| 4 | 2.726768e − 004 | −2.037007e − 006 |
| 5 | −1.919901e − 003 | 2.143458e − 003 |

Under such conditions, the following expressions were established:
f/Bf=0.678
$|f_2|/|f_1|$=0.645

Figure 3:
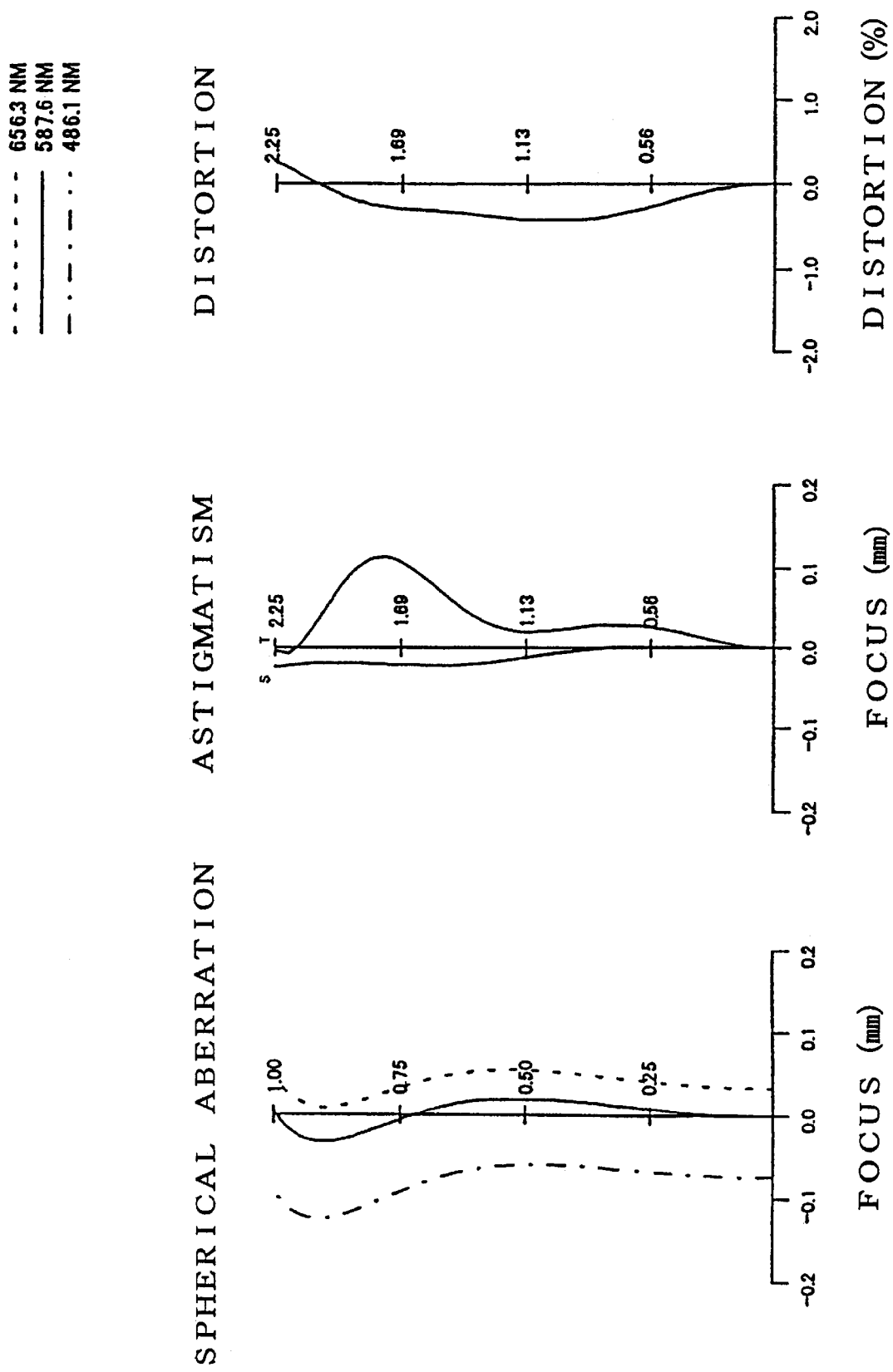
FIG. 3 is graphs showing the spherical aberration, the astigmatism and the distortion of the image pickup lens system shown in FIG. 2.

In the image pickup lens system in Example 1, the spherical aberration, the astigmatism and the distortion are shown in FIG. 3.

It can be seen from the results that any of the spherical aberration, the astigmatism and the distortion was a substantially satisfactory value and hence, sufficient optical characteristics could be provided.

Example 2

Figure 4:
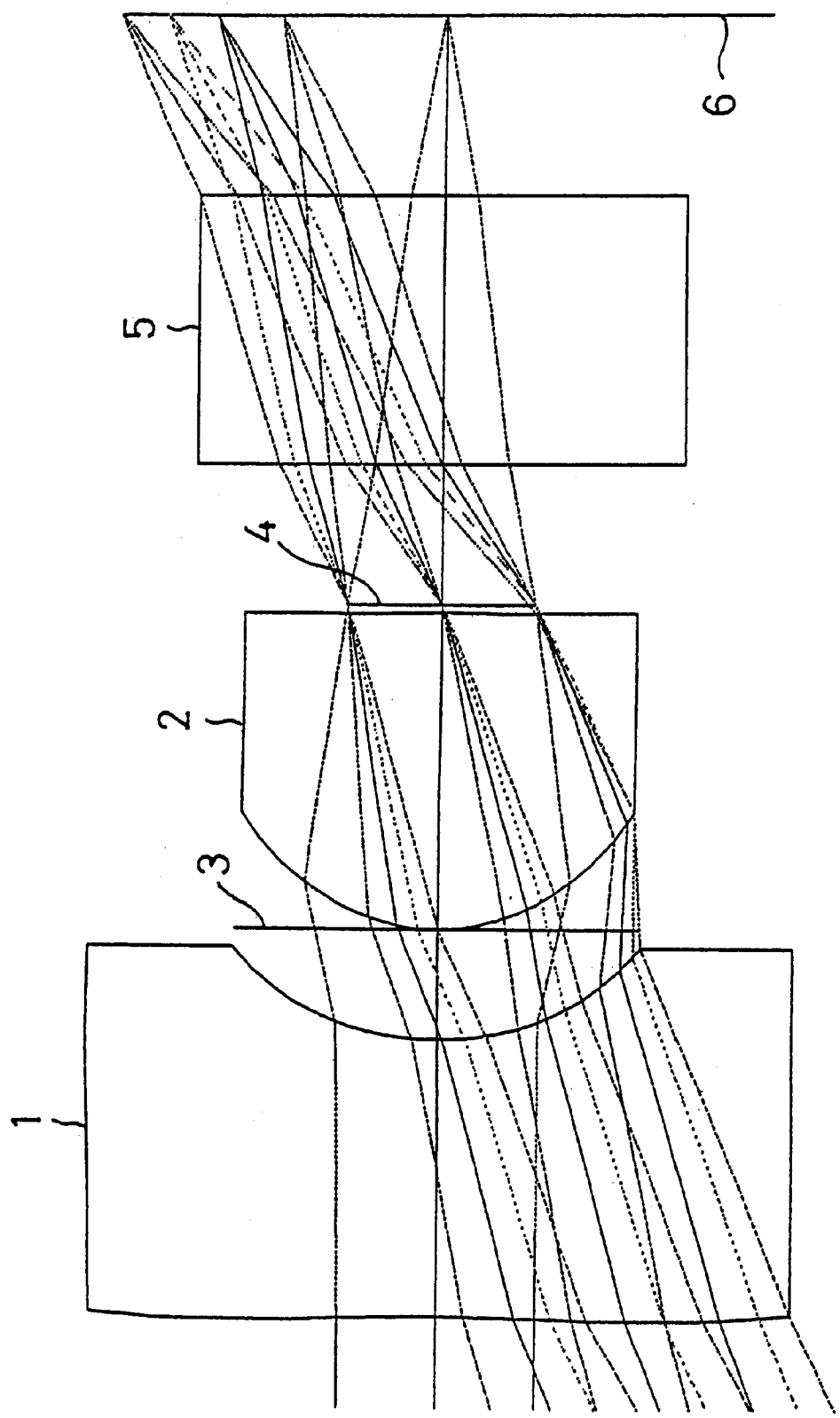
FIG. 4 is an illustration showing a second example of an image pickup lens system according to the present invention.

FIG. 4 shows a second example. In this example, a diaphragm 4 is disposed at a location displaced from the second face of a second lens 2 toward an image. The image pickup lens system of the second example is set under conditions which will be described below.

The back focal length Bf in the present example is an air-reduced length from the diaphragm 4 to the CCD face (the image pickup face.
f=3.822 mm, F=2.80, and 2ω=59.1°
$f_1$=−3.52 mm, $f_2$=2.39 mm, and Bf=3.533 mm

| Face | Radius r of curvature | Distance d | Refractive index nd | Abbe constant vd |
|---|---|---|---|---|
| (1) First face of first lens | −20.000 | 1.9500 | 1.49194 | 57.8 |
| (2) Second face of first lens | 1.954 | 0.7900 | | |
| (3) aperture plate | 0.000 | 1.0000 | | |

-continued

| Face | Radius r of curvature | Distance d | Refractive index nd | Abbe constant vd |
|---|---|---|---|---|
| (4) First face of second lens | 1.320 | 2.2600 | 1.525000 | 56.0 |
| (5) Second face of second lens | −10.669 | 0.0500 | | |
| (6) Diaphragm | 0.000 | 1.0000 | | |
| (7) First face of cover glass | 0.000 | 1.9500 | 1.51633 | 64.2 |
| (8) Second face of cover glass | 0.000 | 1.2466 | | |
| (9) CCD face | 0.000 | | | |

| | k | a | b |
|---|---|---|---|
| 1 | 0.000000e + 000 | 7.067572e − 003 | −3.642840e − 004 |
| 2 | −7.108855e − 001 | 9.450419e − 003 | 1.246843e − 002 |
| 4 | −3.692356e − 001 | −2.297919e − 002 | 4.914827e − 003 |
| 5 | 0.000000e + 000 | 4.650462e − 002 | 7.321352e − 002 |

| | c | d |
|---|---|---|
| 1 | 0.000000e + 000 | 0.000000e + 000 |
| 2 | 0.000000e + 000 | 0.000000e + 000 |
| 4 | 0.000000e + 000 | 0.000000e + 000 |
| 5 | 0.000000e + 000 | 0.000000e + 000 |

Under such conditions, the following expressions were established:
f/Bf=1.08
$|f_2|/|f_1|$=0.679

Figure 5:
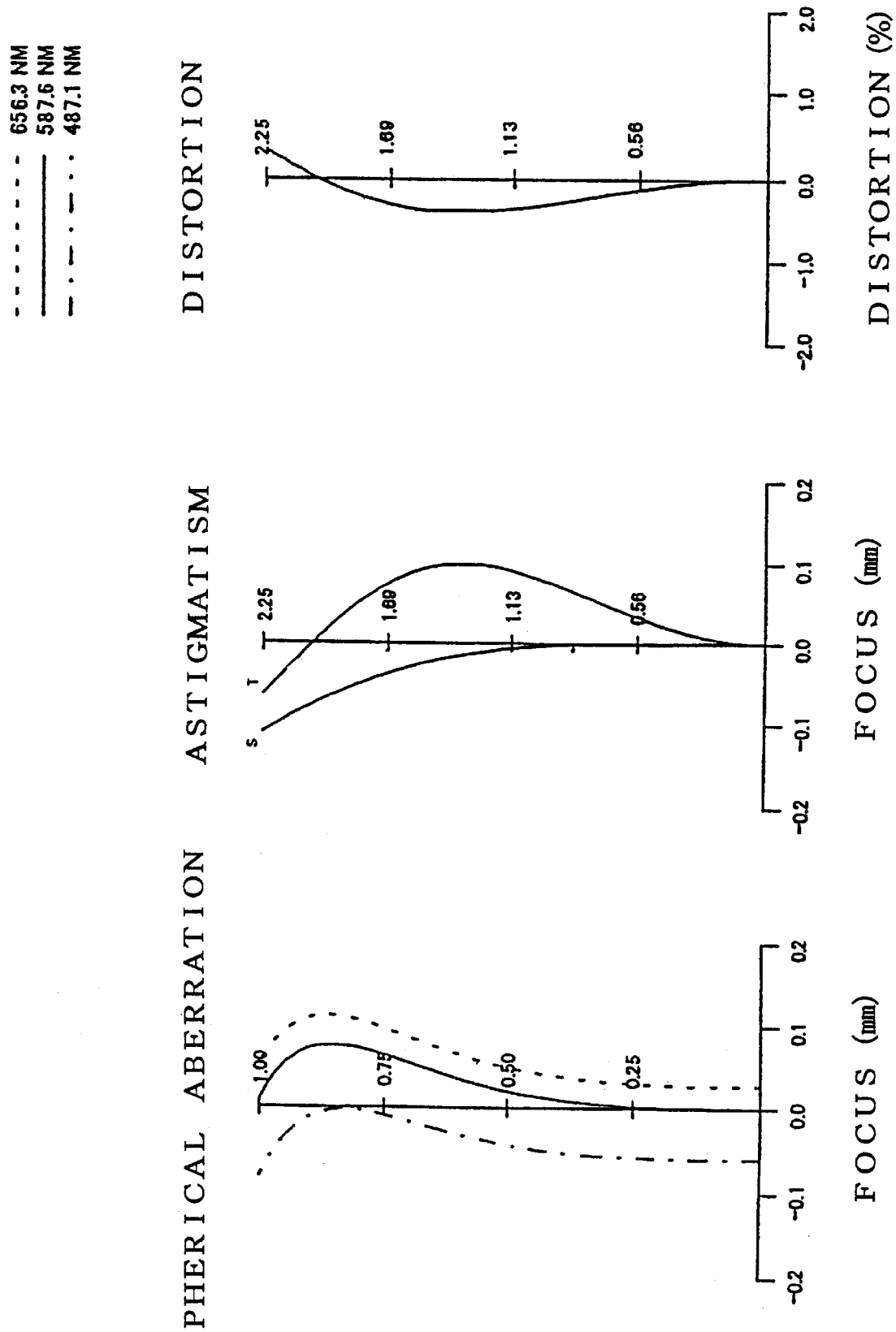
FIG. 5 is graphs showing the spherical aberration, the astigmatism and the distortion of the image pickup lens system shown in FIG. 4.

In the image pickup lens system in Example 2, the spherical aberration, the astigmatism and the distortion are shown in FIG. 5.

It can be also seen from the results that any of the spherical aberration, the astigmatism and the distortion was a substantially satisfactory value and hence, sufficient optical characteristics could be provided.

Example 3

Figure 6:
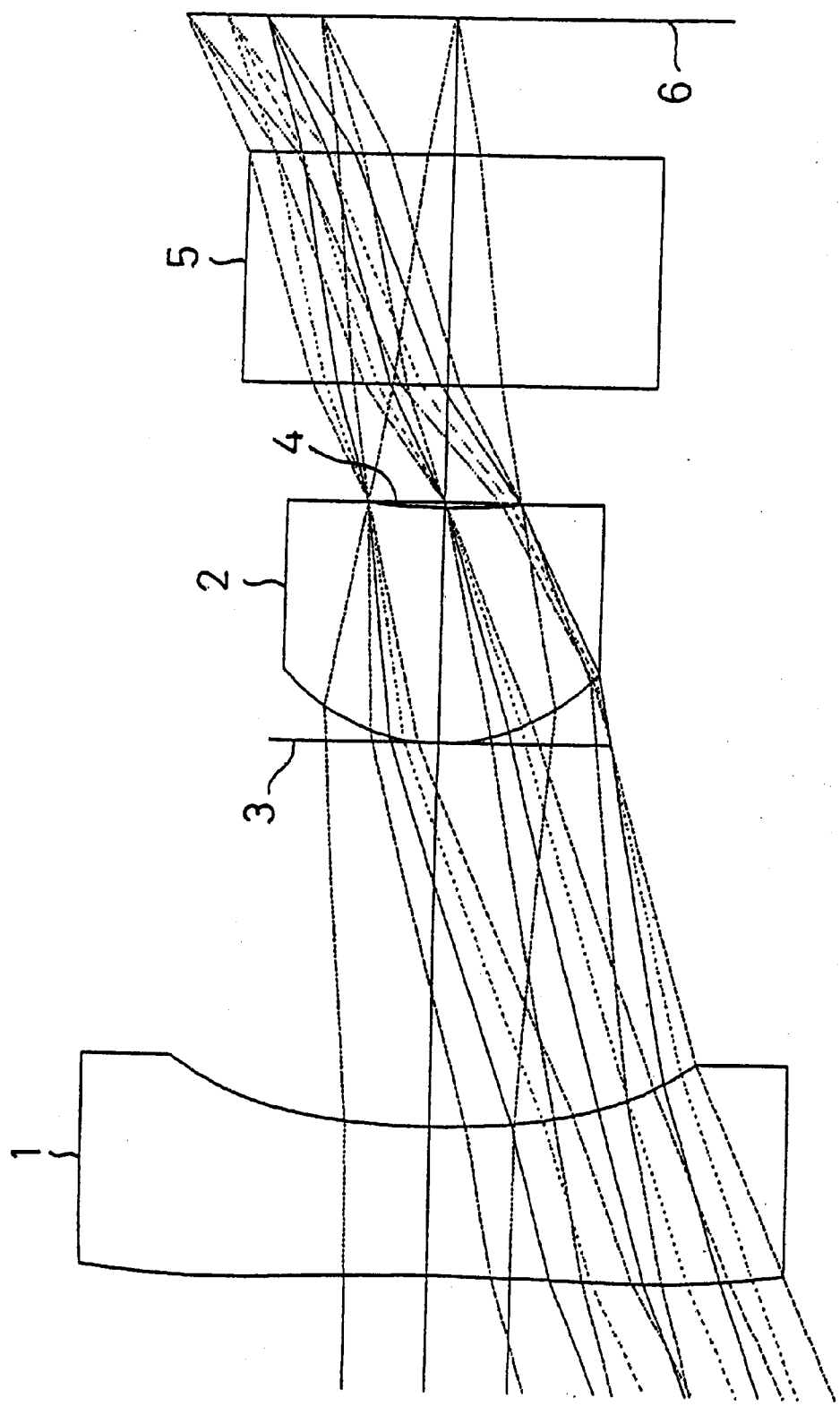
FIG. 6 is an illustration showing a third example of an image pickup lens system according to the present invention.

FIG. 6 shows a third example. In this example, a diaphragm 4 is disposed at a location displaced from the second face of a second lens 2 toward an image. The image pickup lens system of the third example is set under conditions which will be described below.

The back focal length Bf in the present example is an air-reduced length from the diaphragm 4 to the CCD face (the image pickup face.
f=3.823 mm, F=2.80, and 2ω=59.0°
$f_1$=−10.04 mm, $f_2$=3.63 mm, and Bf=3.433 mm

| Face | Radius r of curvature | Distance d | Refractive index nd | Abbe constant vd |
|---|---|---|---|---|
| (1) First face of first lens | −17.951 | 1.2500 | 1.49194 | 57.8 |
| (2) Second face of first lens | 6.973 | 3.2453 | | |
| (3) aperture plate | 0.000 | 0.0000 | | |
| (4) First face of second lens | 1.320 | 2.2600 | 1.525000 | 56.0 |
| (5) Second face of second lens | −6.818 | 0.0500 | | |

-continued

| Face | Radius r of curvature | Distance d | Refractive index nd | Abbe constant vd |
|---|---|---|---|---|
| (6) Diaphragm | 0.000 | 1.0000 | | |
| (7) First face of cover glass | 0.000 | 1.9500 | 1.51633 | 64.2 |
| (8) Second face of cover glass | 0.000 | 1.1472 | | |
| (9) CCD face | 0.000 | | | |

| | k | a | b |
|---|---|---|---|
| 1 | 0.000000e + 000 | 5.220384e − 003 | −1.561860e − 004 |
| 2 | −3.558246e + 000 | 9.258002e − 003 | 3.508585e − 004 |
| 4 | −5.278456e − 002 | −6.924522e − 003 | 1.282288e − 003 |
| 5 | 0.000000e − 000 | 7.387966e − 002 | 2.298691e − 002 |

| | c | d |
|---|---|---|
| 1 | 0.000000e + 000 | 0.000000e + 000 |
| 2 | 0.000000e + 000 | 0.000000e + 000 |
| 4 | 0.000000e + 000 | 0.000000e + 000 |
| 5 | 0.000000e + 000 | 0.000000e + 000 |

Under such conditions, the following expressions were shed:
f/Bf=1.114
$|f_2|/|f_1|$=0.362

Figure 7:
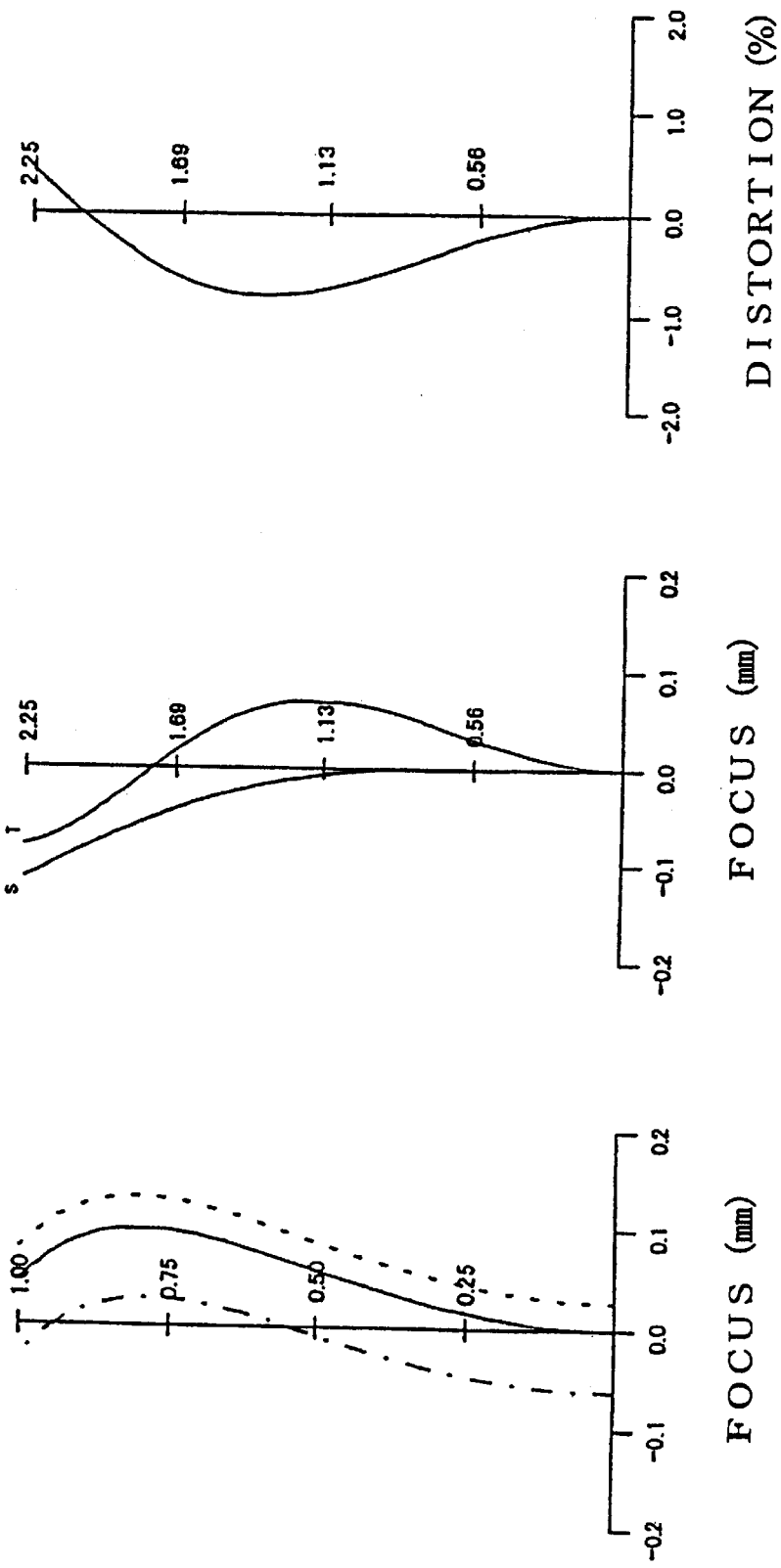
FIG. 7 is graphs showing the spherical aberration, the astigmatism and the distortion of the image pickup lens system shown in FIG. 6.

In the image pickup lens system in Example 3, the spherical aberration, the astigmatism and the distortion are shown in FIG. 7.

It can be also seen from the results that any of the spherical aberration, the astigmatism and the distortion was a substantially satisfactory value and hence, sufficient optical characteristics could be provided.

Example 4

Figure 8:
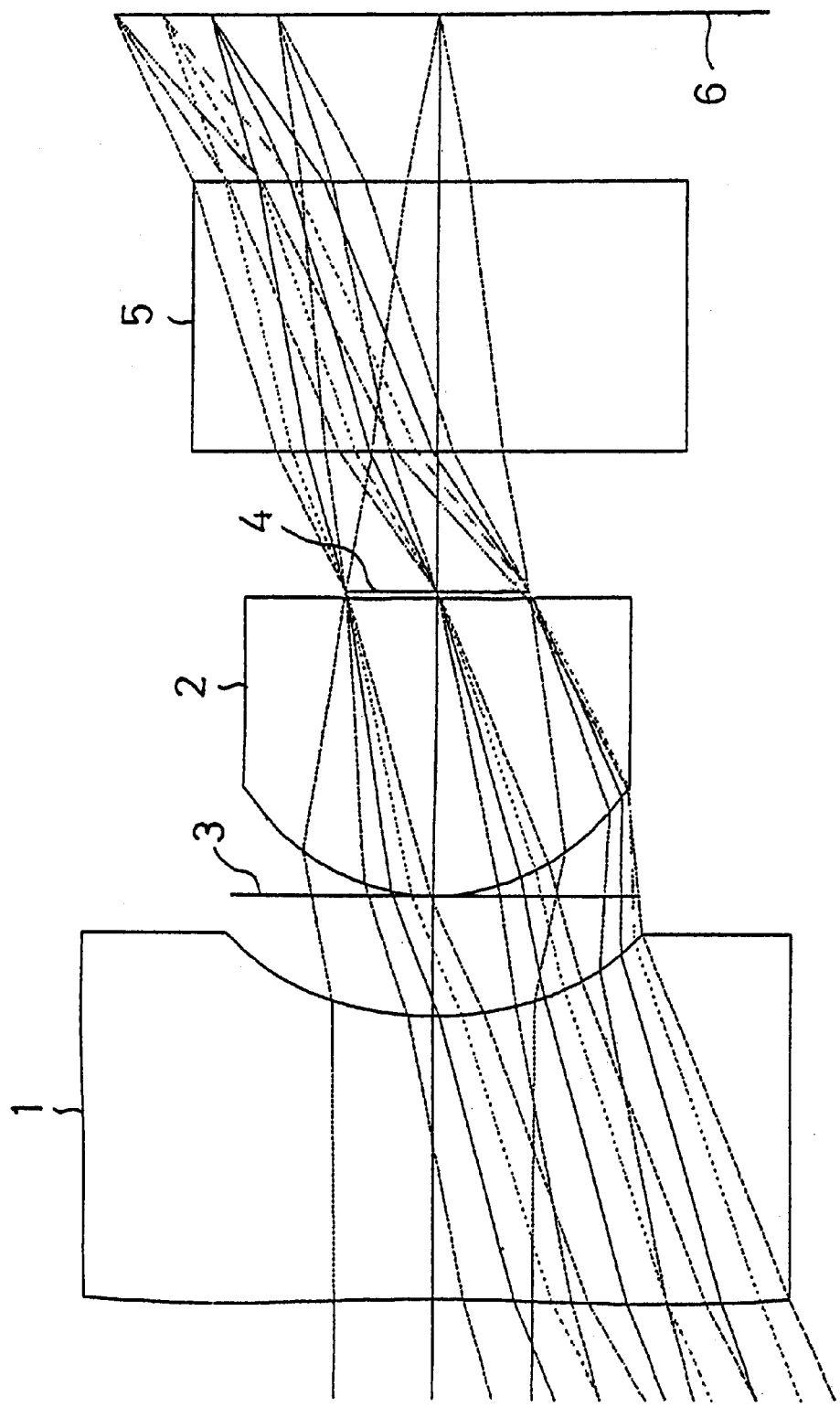
FIG. 8 is an illustration showing a fourth example of an image pickup lens system according to the present invention.

FIG. 8 shows a fourth example. In this example, a diaphragm 4 is disposed at a location displaced from the second face of a second lens 2 toward an image. The image pickup lens system of the fourth example is set under conditions which will be described below.

The back focal length Bf in the present example is an air-reduced length from the diaphragm 4 to the CCD face (the image pickup face.
f=3.821 mm, F=2.80, and 2ω=59.0°
$f_1$=−4.02 mm, $f_2$=2.50 mm, and Bf=3.458 mm

| Face | Radius r of curvature | Distance d | Refractive index nd | Abbe constant vd |
|---|---|---|---|---|
| (1) First face of first lens | −17.951 | 2.0000 | 1.49194 | 57.8 |
| (2) Second face of first lens | 2.302 | 0.8500 | | |
| (3) aperture plate | 0.000 | 0.0000 | | |
| (4) First face of second lens | 1.356 | 2.1500 | 1.525000 | 56.0 |
| (5) Second face of second lens | −17.609 | 0.0500 | | |
| (6) Diaphragm | 0.000 | 1.0000 | | |
| (7) First face of cover glass | 0.000 | 1.9500 | 1.51633 | 64.2 |

-continued

| Face | Radius r of curvature | Distance d | Refractive index nd | Abbe constant vd |
|---|---|---|---|---|
| (8) Second face of cover glass | 0.000 | 1.1718 | | |
| (9) CCD face | 0.000 | | | |

| | k | a | b |
|---|---|---|---|
| 1 | 0.000000e + 000 | 6.812410e − 003 | −3.326511e − 004 |
| 2 | −1.201277e + 000 | 1.743961e − 002 | 9.791295e − 003 |
| 4 | −2.965930e − 001 | −1.973814e − 002 | 4.501952e − 003 |
| 5 | 0.000000e − 000 | 5.240180e − 002 | 7.520394e − 002 |

| | C | D |
|---|---|---|
| 1 | 0.000000e + 000 | 0.000000e + 000 |
| 2 | 0.000000e + 000 | 0.000000e + 000 |
| 4 | 0.000000e + 000 | 0.000000e + 000 |
| 5 | 0.000000e + 000 | 0.000000e + 000 |

Under such conditions, the following expressions were established:
f/Bf=1.105
$|f_2|/|f_1|$=0.622

Figure 9:
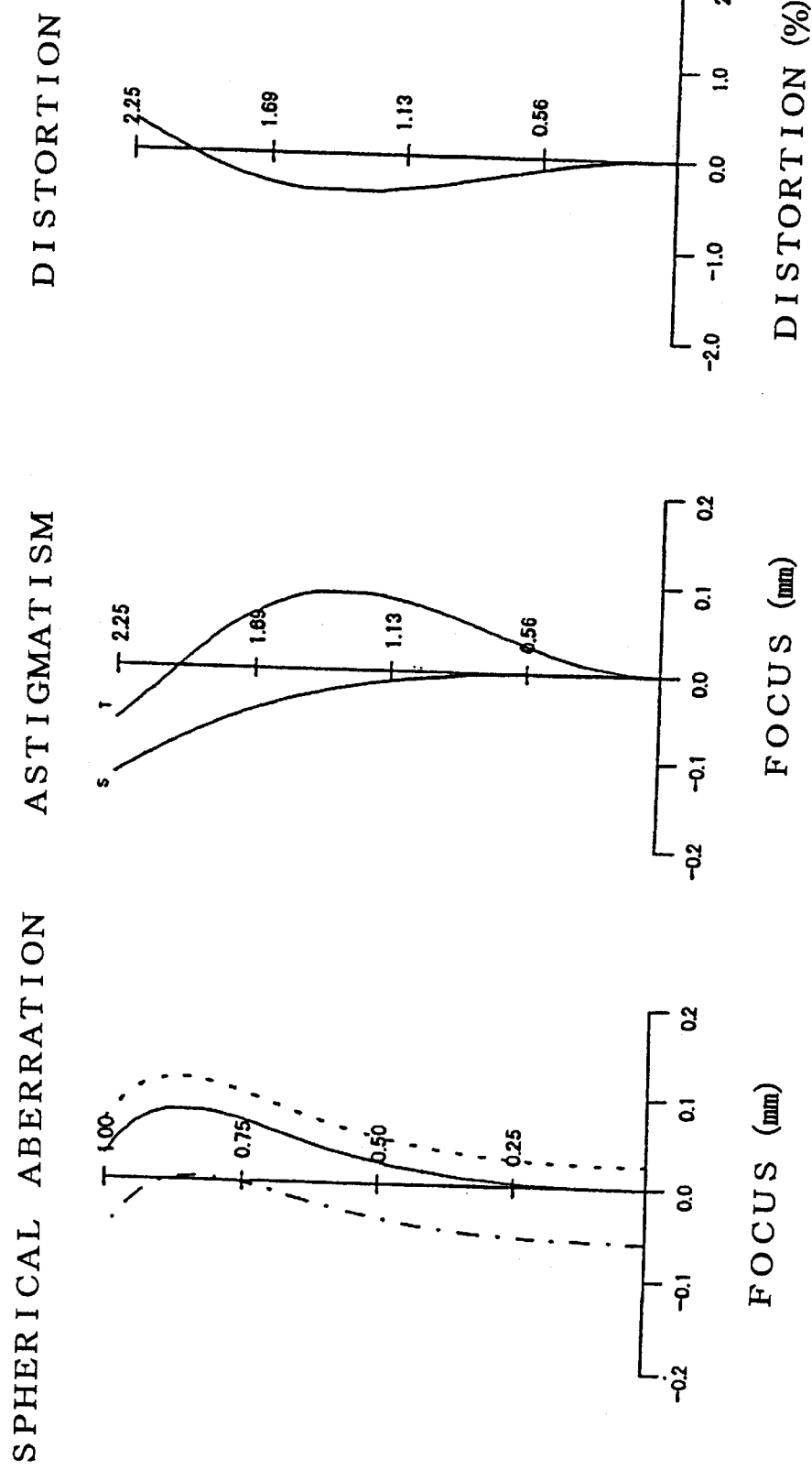
FIG. 9 is graphs showing the spherical aberration, the astigmatism and the distortion of the image pickup lens system shown in FIG. 8.

In the image pickup lens system in Example 4, the spherical aberration, the astigmatism and the distortion are shown in FIG. 9.

It can be also seen from the results that any of the spherical aberration, the astigmatism and the distortion was a substantially satisfactory value and hence, sufficient optical characteristics could be provided.

Example 5

Figure 10:
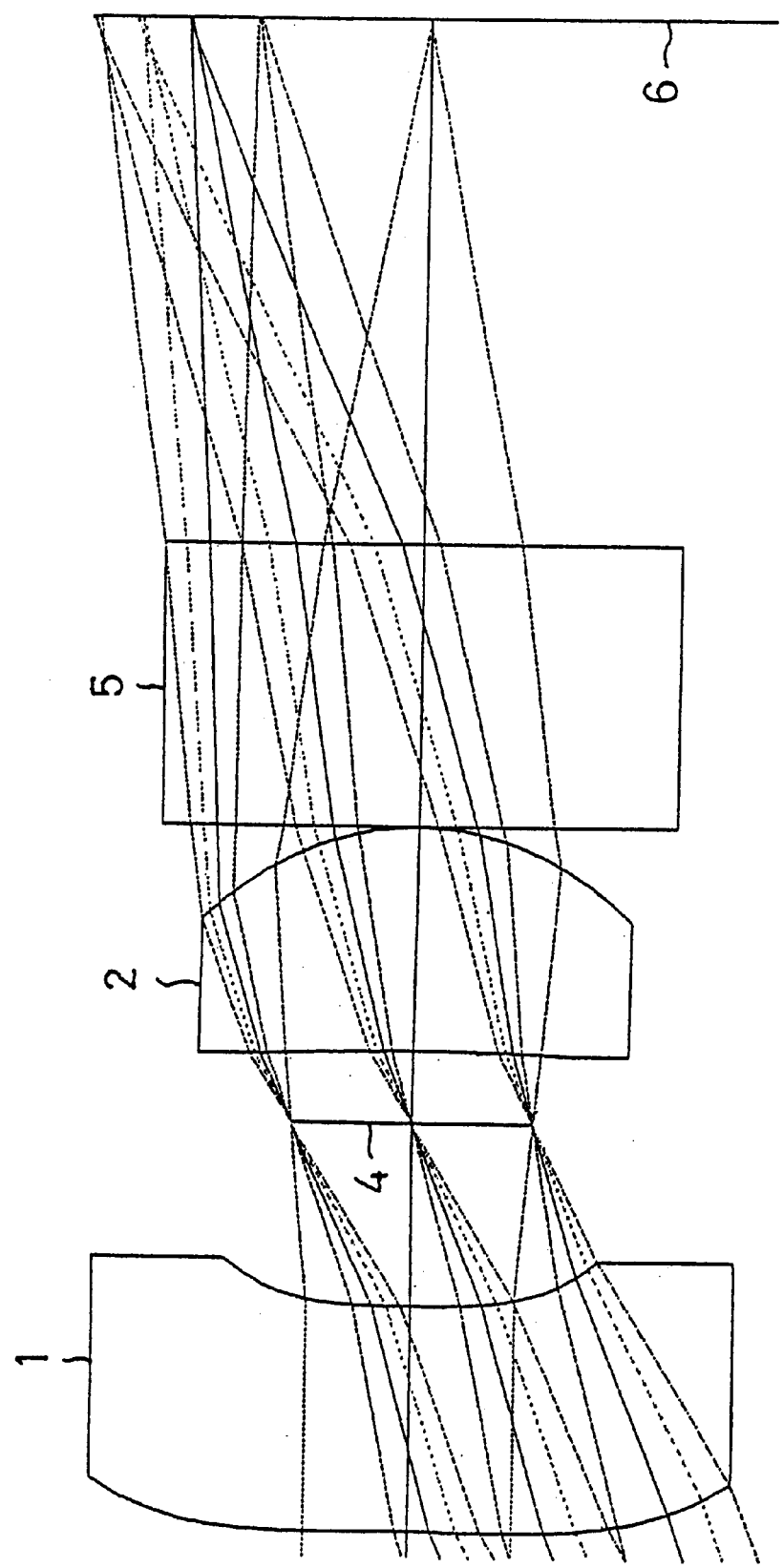
FIG. 10 is an illustration showing a fifth example of an image pickup lens system according to the present invention.

FIG. 10 shows a fifth example. In this example, a diaphragm 4 is disposed between first and second lenses 1 and 2. The image pickup lens system of the fifth example is set under conditions which will be described below.

The back focal length Bf in the present example is an air-reduced length from the second face of the second lens 2 to the CCD face (the image pickup face).
f=3.820 mm, F=2.80, and 2ω=60.80
$f_1$=12.25 mm, $f_2$=3.63 mm, and Bf=4.816 mm

| Face | Radius r of curvature | Distance d | Refractive index nd | Abbe constant vd |
|---|---|---|---|---|
| (1) First face of first lens | −27.860 | 1.5000 | 1.49194 | 57.8 |
| (2) Second face of first lens | 7.824 | 1.2371 | | |
| (3) Diaphragm plate | 0.000 | 0.5000 | | |
| (4) First face of second lens | −30.404 | 1.5000 | 1.491940 | 57.8 |
| (5) Second face of second lens | −1.712 | 0.0000 | | |
| (6) First face of cover glass | 0.000 | 1.9500 | 1.51633 | 64.2 |
| (7) Second face of cover glass | 0.000 | 3.5295 | | |
| (8) CCD face | 0.000 | | | |

|   | k | A | b |
|---|---|---|---|
| 1 | 0.000000e + 000 | 2.472089e − 002 | −8.284209e − 004 |
| 2 | 0.000000e + 000 | 7.717637e − 002 | 1.365282e − 002 |
| 4 | 0.000000e − 000 | −2.004708e − 002 | 1.131735e − 002 |
| 5 | −1.000000e − 000 | −1.737578e − 002 | 2.222821e − 003 |

|   | C | d |
|---|---|---|
| 1 | 0.000000e + 000 | 0.000000e + 000 |
| 2 | 0.000000e + 000 | 0.000000e + 000 |
| 4 | 0.000000e + 000 | 0.000000e + 000 |
| 5 | 0.000000e + 000 | 0.000000e + 000 |

Under such conditions, the following expressions were established:

f/Bf=0.793

$|f_2|/|f_1|=0.296$

Figure 11:
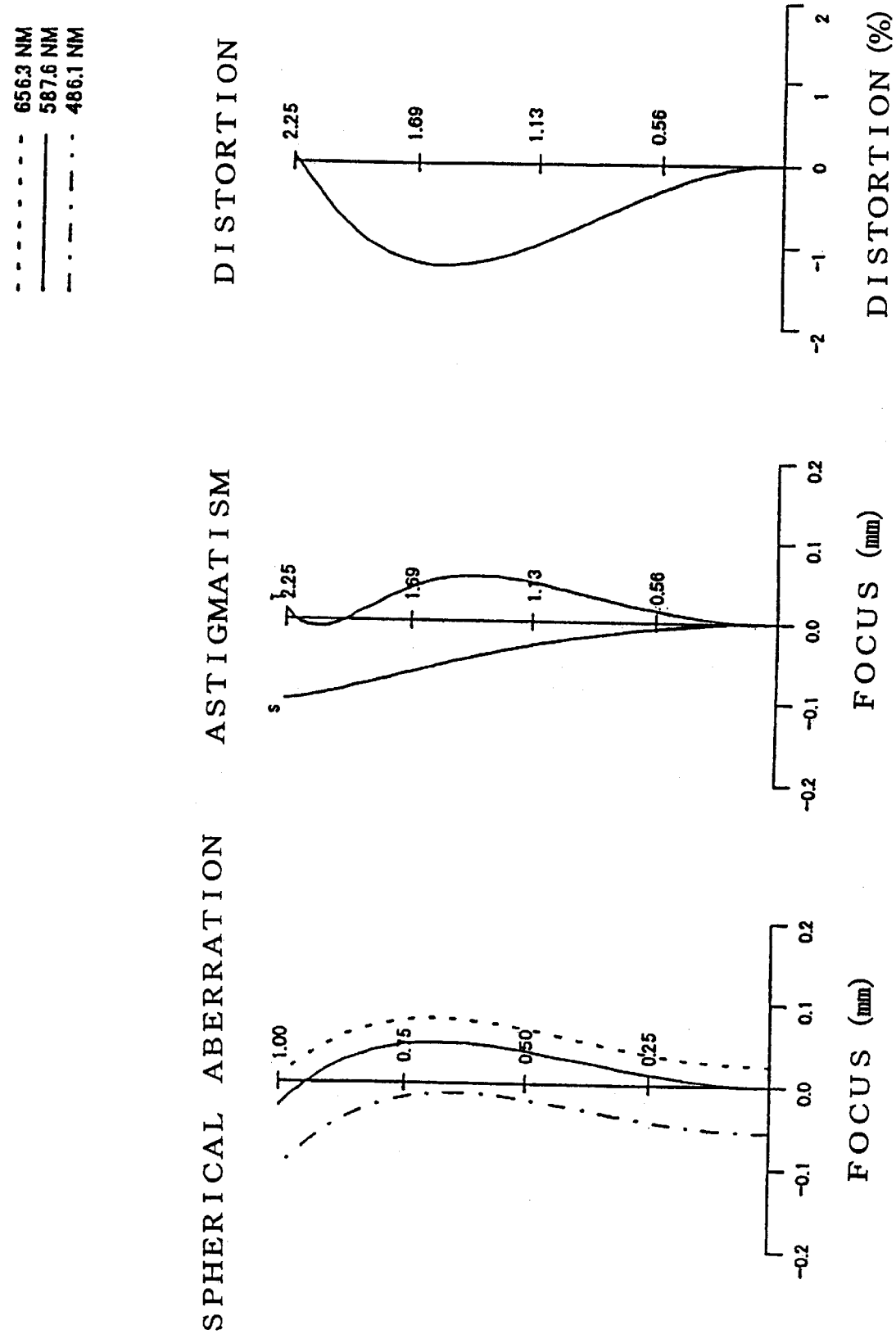
FIG. 11 is graphs showing the spherical aberration, the astigmatism and the distortion of the image pickup lens system shown in FIG. 10.

In the image pickup lens system in Example 5, the spherical aberration, the astigmatism and the distortion are shown in FIG. 11.

It can be also seen from the results that any of the spherical aberration, the astigmatism and the distortion was a substantially satisfactory value and hence, sufficient optical characteristics could be provided.

Although the embodiment of the present invention has been described in detail, it will be understood that the present invention is not limited to the above-described embodiment, and various modifications may be made without departing from the spirit and scope of the invention defined in claims.

What is claimed is:

1. An image pickup lens system, comprising a first lens which is a concave lens having those radii of curvature-of faces at the center thereof, which are not of the same sign, and a second lens which is a convex lens, the first face of at least said first lens being formed into an aspherical shape, so that the following conditions (1) and (2) are satisfied:

(1) 0.67Bf<f<1.45Bf (2) $0.25|f_1|<|f_2|<0.8|f_1|$ wherein Bf is a back focal length; f is a focal length of the entire lens system; $f_1$ is a focal length of said first lens; and $f_2$ is a focal length of said second lens.

2. An image pickup lens system according to claim 1, wherein the radii of curvature of the first and second faces of said first lens at the center thereof are of different signs.

* * * * *